US009686965B2

(12) United States Patent
Norris

(10) Patent No.: US 9,686,965 B2
(45) Date of Patent: Jun. 27, 2017

(54) TIMED DEER FEEDER WITH RESTRICTED ACCESS

(71) Applicant: BNR Technology Development LLC, Conroe, TX (US)

(72) Inventor: Jeffrey B. Norris, Montgomery, TX (US)

(73) Assignee: BNR Technology Development, LLC, Conroe, TX (US)

( * ) Notice: Subject to any disclaimer, the term of this patent is extended or adjusted under 35 U.S.C. 154(b) by 74 days.

(21) Appl. No.: 14/665,698

(22) Filed: Mar. 23, 2015

(65) Prior Publication Data

US 2015/0189855 A1 Jul. 9, 2015

Related U.S. Application Data

(63) Continuation-in-part of application No. 14/596,788, filed on Jan. 14, 2015, now abandoned, and a continuation of application No. 13/751,478, filed on Jan. 28, 2013, now abandoned.

(51) Int. Cl.
*A01K 5/02* (2006.01)

(52) U.S. Cl.
CPC .......... *A01K 5/0291* (2013.01); *A01K 5/0225* (2013.01); *A01K 5/0275* (2013.01)

(58) Field of Classification Search
CPC .......... A01K 5/00; A01K 5/001; A01K 5/004; A01K 5/02; A01K 5/0225; A01K 5/0241; A01K 5/025; A01K 5/0275; A01K 5/0291
USPC .... 119/57.1, 51.12, 57.91, 57.92, 61.2, 52.1, 119/51.01, 51.11
See application file for complete search history.

(56) References Cited

U.S. PATENT DOCUMENTS

| | | | | |
|---|---|---|---|---|
| 1,346,784 A * | 7/1920 | Hamilton | ............... | A01K 5/025 119/52.4 |
| 1,424,079 A * | 7/1922 | Canell | .................. | A01K 5/0291 119/51.13 |
| 2,500,243 A * | 3/1950 | Dixon | .................. | A01K 5/0291 119/51.13 |
| 3,067,722 A * | 12/1962 | Strong | .................... | A01K 5/025 119/53.5 |
| 3,180,318 A * | 4/1965 | Fisher | .................. | A01K 5/0275 119/51.11 |
| 3,434,459 A * | 3/1969 | Green | .................. | A01K 5/0275 119/51.11 |
| 3,587,530 A * | 6/1971 | Blair | .................... | A01K 5/0291 119/51.11 |
| 3,658,036 A * | 4/1972 | Caracappa | ........... | A01K 5/0291 119/51.13 |
| 4,363,291 A * | 12/1982 | Harmsen | ............. | A01K 5/0283 119/51.02 |
| 4,572,108 A * | 2/1986 | Daifotes | .............. | A01K 1/0005 119/51.01 |

(Continued)

OTHER PUBLICATIONS

USPTO Office Action for U.S. Appl. No. 14/596,788 dated Aug. 5, 2016.

*Primary Examiner* — Joshua Huson
(74) *Attorney, Agent, or Firm* — Tumey L.L.P.

(57) ABSTRACT

An animal feed dispenser includes a feeding tube for receiving a predetermined amount of animal feed from a hopper. The feeding tube includes at least one opening through which animals may access the interior of the feeding tube. The opening may be closed by a movable closure flap so as to restrict access to the animal feed located within the feeding tube.

5 Claims, 6 Drawing Sheets

(56) References Cited

U.S. PATENT DOCUMENTS

| | | | | |
|---|---|---|---|---|
| 4,665,862 A | * | 5/1987 | Pitchford, Jr. | A01K 5/0291 119/51.11 |
| 5,050,770 A | * | 9/1991 | Smiley | A01K 5/0225 177/114 |
| 5,119,765 A | * | 6/1992 | Roush, Jr. | A01K 5/0275 119/57.91 |
| 7,849,816 B2 | | 12/2010 | Dollar et al. | |
| 2006/0249088 A1 | * | 11/2006 | Eu | A01K 1/033 119/51.02 |
| 2007/0044724 A1 | * | 3/2007 | Kvols | A01K 5/0291 119/56.1 |
| 2007/0051317 A1 | * | 3/2007 | Bruner | A01K 1/0107 119/53 |
| 2007/0227461 A1 | * | 10/2007 | Chern | A01K 1/033 119/482 |
| 2008/0029034 A1 | * | 2/2008 | Busbice | A01K 5/025 119/51.11 |
| 2009/0199773 A1 | * | 8/2009 | Jurk | A01K 5/0225 119/57.91 |
| 2009/0241845 A1 | * | 10/2009 | Croft | A01K 5/0291 119/51.11 |
| 2010/0107983 A1 | * | 5/2010 | Gates | A01K 5/0225 119/53 |
| 2010/0242846 A1 | * | 9/2010 | Kolkovski | A01K 61/025 119/51.04 |
| 2010/0307421 A1 | | 12/2010 | Gates | |

\* cited by examiner

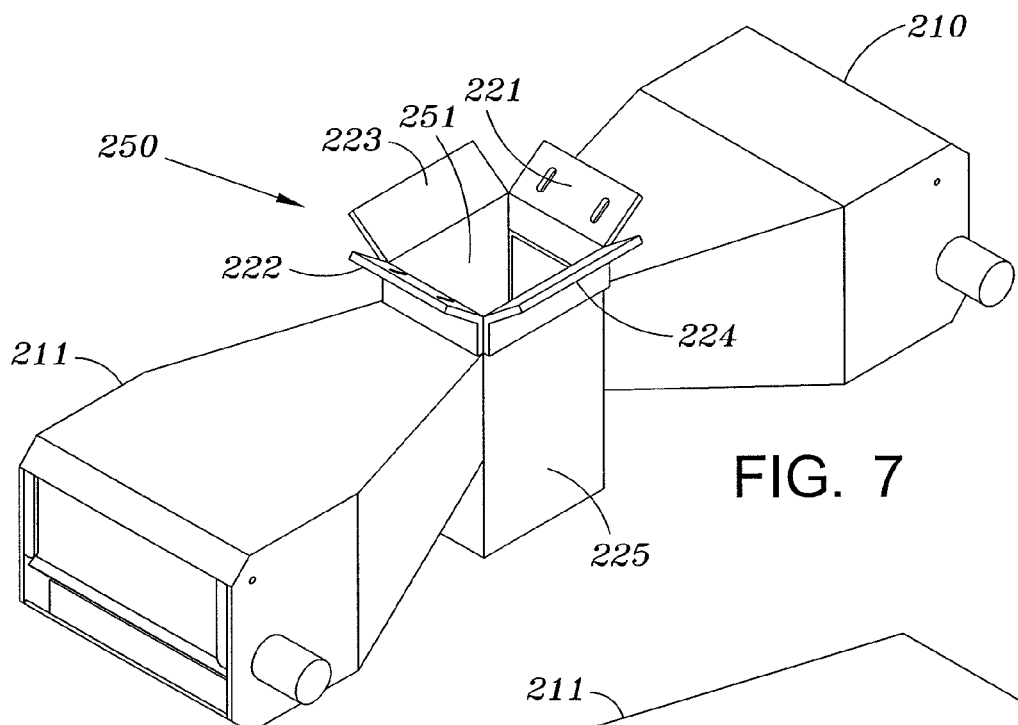
FIG. 7
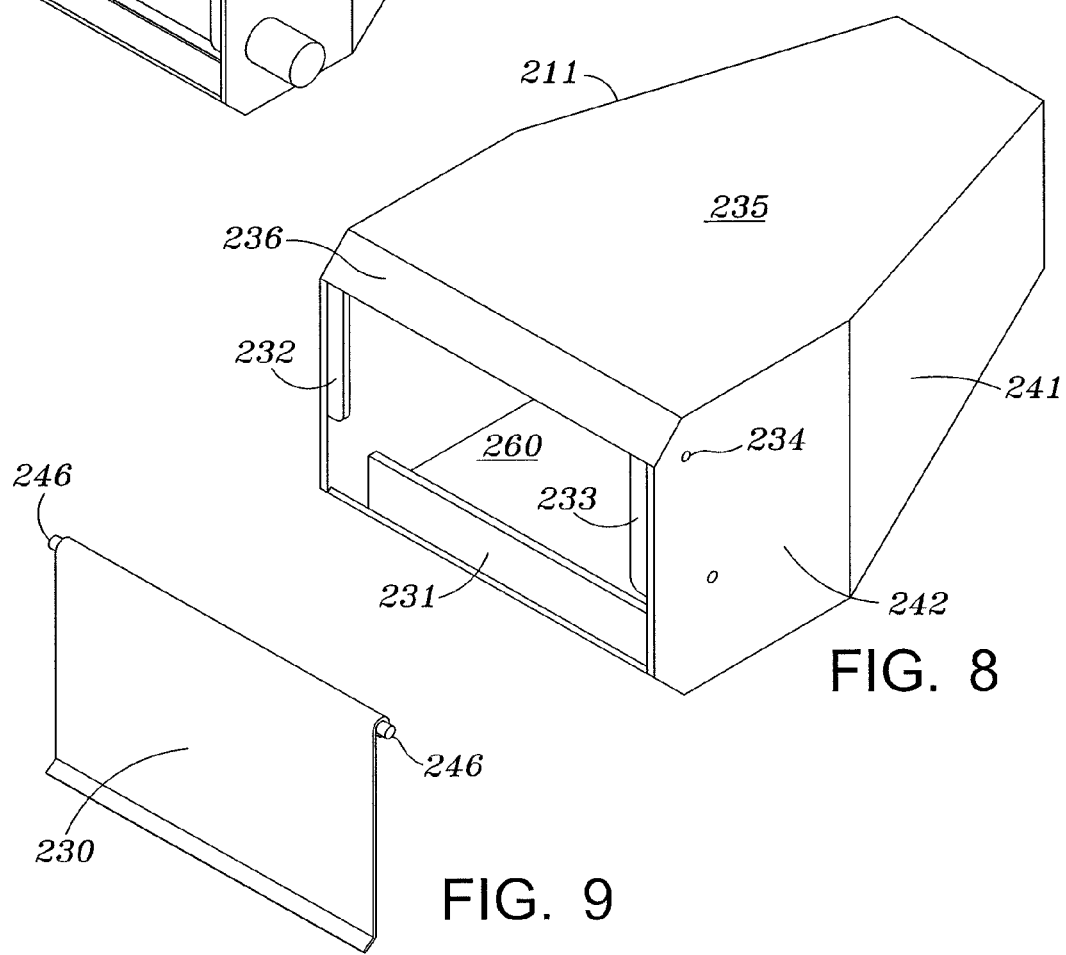
FIG. 8
FIG. 9

TIMED DEER FEEDER WITH RESTRICTED ACCESS

This application is a continuation-in-part application of U.S. Ser. No. 14/596,788 filed on Jan. 14, 2015 which is a continuation of U.S. Ser. No. 13/751,478 filed on Jan. 28, 2013.

BACKGROUND OF INVENTION

1. Field of the Invention

This invention relates to apparatus for periodically dispensing a controlled amount of animal feed. One application of the apparatus is to dispense a controlled amount of deer feed in remote areas so as to lure game to a particular location for hunting purposes.

2. Description of Related Art

There are several devices in use for dispensing animal feed in remote locations. However, several of them suffer from the following characteristics. Many are of the scattering type which dispenses the feed over a project area on the ground. In this situation, a good portion of the feed is consumed by other than targeted animals. For example, if the hunted game is deer, many other types of animals such as wild hogs, squirrels, raccoons, etc. will consume the food. This results in an increase in the amount of feed that is broadcasted.

Other types include a tripod supported hopper with the scatterer and motor drive located beneath the hopper which interferes with the movement of animals underneath the apparatus. As deer, hogs and other animals feed, they damage the spreader or drive units by hitting the units with their horns, heads, or parts of their body, in some cases, chewing the wiring. Once damaged, they no longer function as designed. This problem is eliminated by placing all electrical and moving parts above the hopper.

BRIEF SUMMARY OF THE INVENTION

The present invention cures the deficiencies noted above by providing a controlled supply of feed and dispensing it in such a way so as to allow access to the feed only to the targeted animal, in one embodiment a deer.

A hopper supplies a controlled amount of feed to a fray-like feeder which is positioned above the ground at a distance such that only the targeted animals can access the food or the tray. Animals may access the food through an inlet in the feeder which includes a pivoted flap. The flap may be locked in a closed position to prevent access to the feed.

This significantly reduces the amount of food required to attract the deer which saves money and also reduces the frequency of filling the hopper with feed.

A timer may be provided to selectively activate the dispenser mechanism.

BRIEF DESCRIPTION OF THE SEVERAL VIEWS OF THE DRAWING(S)

FIG. 7 is a perspective view of the feeding tube assembly of the embodiment of FIG. 6.

FIG. 8 is a perspective view of a single discharge tube.

FIG. 9 is a perspective view of a closure flap for the discharge tube.

DETAILED DESCRIPTION OF THE INVENTION

Figure 1:
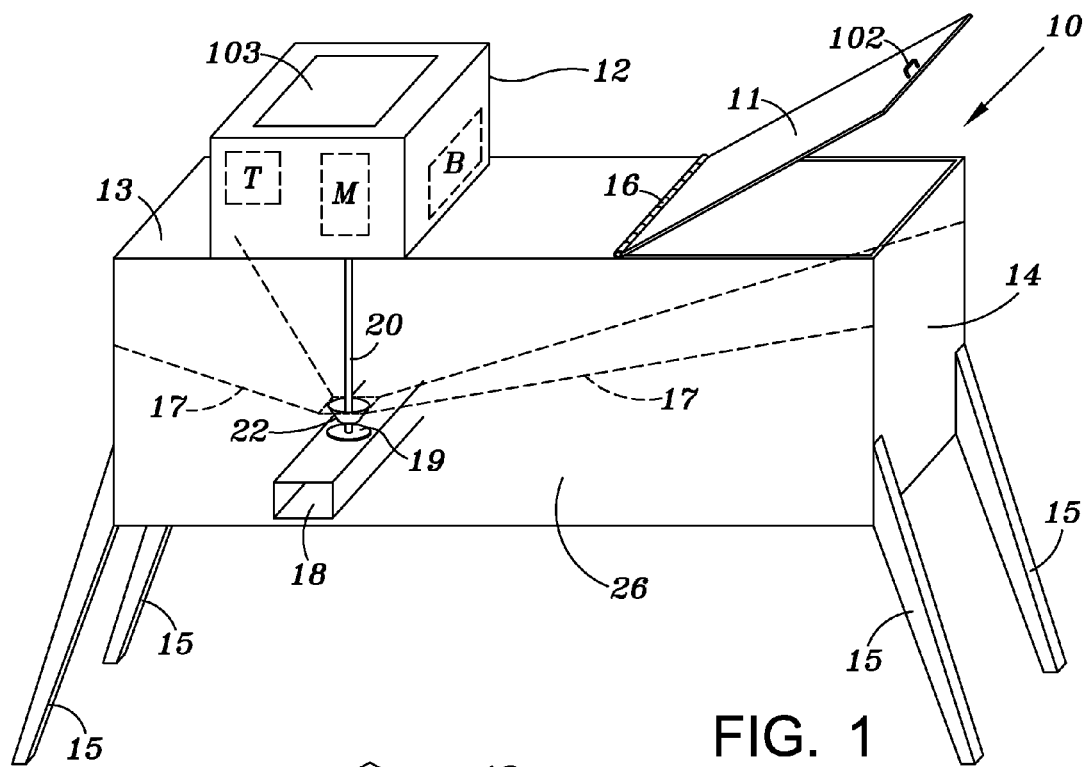
FIG. 1 is a perspective view of the deer feeder according to an embodiment of the invention.
Figure 2:
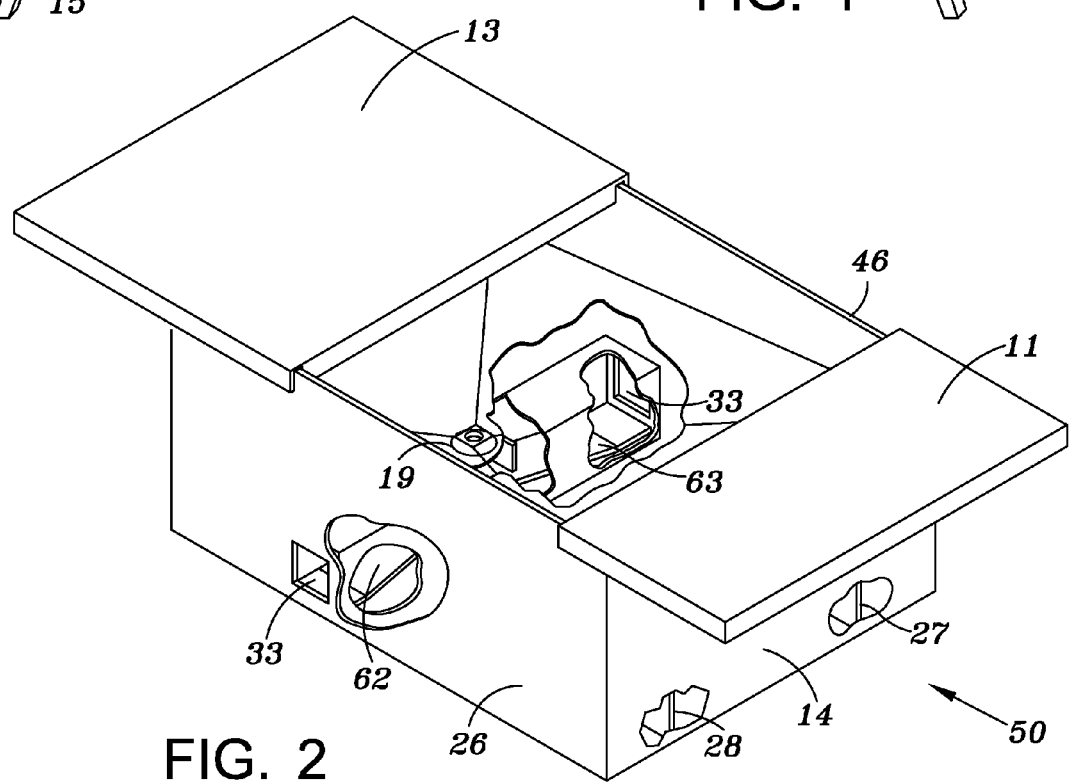
FIG. 2 is a view of an embodiment of the invention showing the hopper and feeding assembly.
Figure 4:
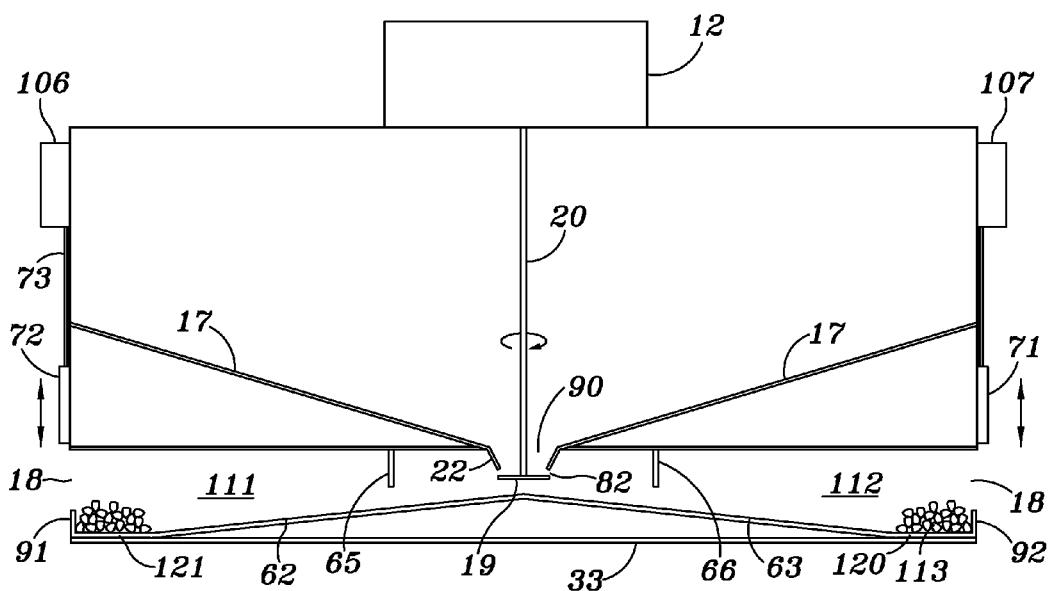
FIG. 4 is a cross-sectional view of the hopper and feeding assembly.

As shown in FIGS. 1 and 2, an embodiment of the deer feeder 10 according to the invention includes a generally rectangular shaped main housing 50 having front and rear panels 26 and 46 and side panels 9 and 14. The housing has a floor 17 which may include a plurality of downwardly sloping sections. An opening 90 is provided at the lowest point of floor 17. A hollow conical member 22 surrounds the opening and extends downwardly from the floor of the hopper as shown in FIG. 4.

The housing includes an upper first cover member 13 which supports a motor M, a timer mechanism T and a power source such as a battery B enclosed with housing 12. The power source may include a solar cell 103 on a top portion of the housing 12 for recharging the battery. A second cover member 11 is pivotally connected at 16 to the housing and includes a handle 102 for providing access to the interior of the housing. This arrangement allows for placement of suitable game feed within the housing 10. The housing further includes openings 18 located at a lower portion of the front and rear panels.

The housing 50 is supported by legs 15 at a height above the ground such that the targeted game, for example deer, is able to feed.

Figure 3:
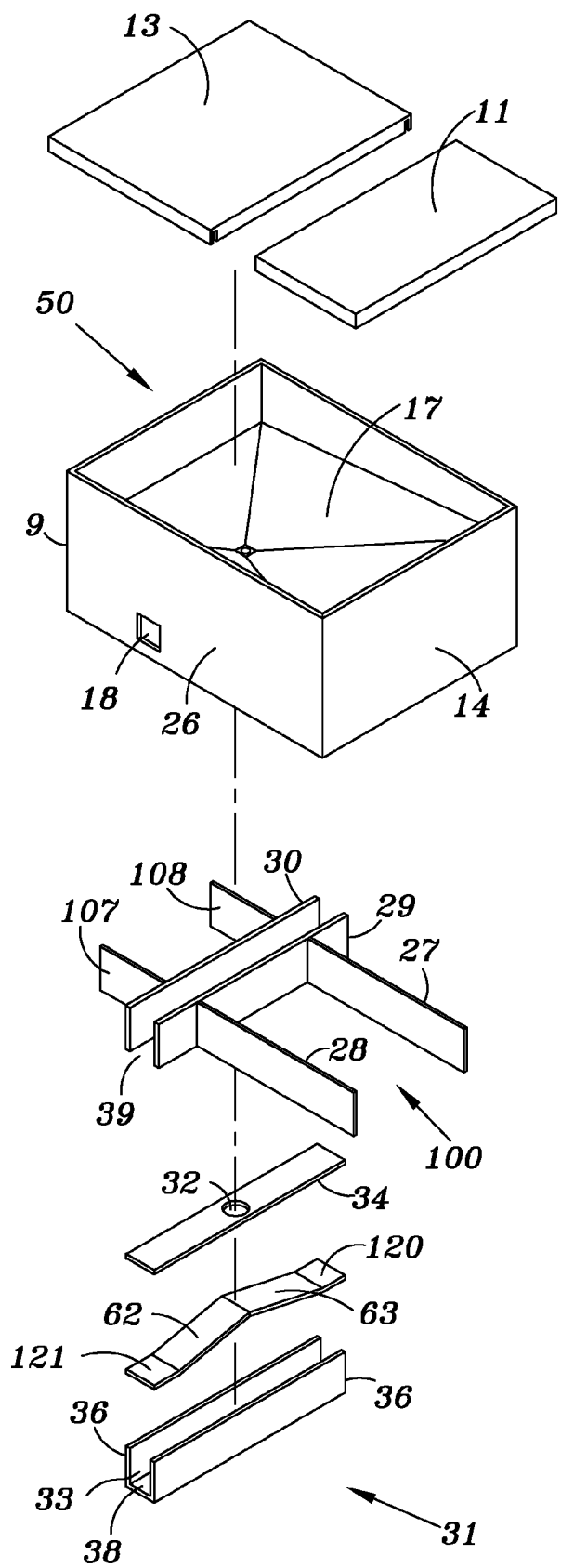
FIG. 3 is an exploded view of FIG. 2.

FIGS. 2 and 3 illustrate an example of a specific construction of the housing and feeding assembly. However it is understood that they represent only an example of the invention and many other arrangements are possible and would be evident to one with ordinary skill in the art.

In order to form a support 100 for a feeding assembly, a plurality of length wise support plates 107, 108, 28 and 27 are secured to sideway plates 29 and 30 in the manner shown in FIG. 3 and the support is the secured to the front, rear and side walls of the housing as shown in FIG. 2. This forms a generally rectangular channel 39.

The feeding assembly 37 shown in FIG. 3 comprises a rectangular feeding tube 31 having front and rear sections 36, a bottom portion 38 and a top portion 34 having an opening 32 through which a shaft 20, a spinner disc 19 and cone member 22 extend in a manner to be discussed below. Feeding tube 31 is secured within channel 39 in any known manner.

FIG. 4 illustrates the details of an embodiment of the dispensing assembly. A hollow cone 22 extends downwardly from opening 90 in the floor 17 of the housing. A spinner disc 19 secured to a shaft 20 is located slightly below the outlet of the cone and thereby forms an annular opening 82 through which animal feed may pass. The size of opening 82 is such that the animal feed will not pass through it until spinner disc 19 is rotated by shaft 20 which is connected to a motor in housing 12 in any known manner. Two baffles 65 and 66 extend downwardly from the top of feeding tube 31 such that animal feed that is thrown outwardly from spinner disc 19 will impinge on the baffles thereby being directed to downwardly inclined floor portions 62 and 63 of the feeding tube. Spinner specimen disc 19 may include one or more blades on its top surface. The floor portion of the feeding tube 31 may also include horizontal sections 121 and 122 that form a retaining area for the feed 113.

Openings 18 in the front and rear walls of the housing are slightly smaller than the openings 33 of the feeding tube 31 such that a pair of upwardly extending tips 91 and 92 cooperate with sloping wall portions 62 and 63 to form a feeding tray at each end of the feeding assembly which will restrain a given amount of animal feed from being discharged through the outlets 18. A timer will selectively energize the motor that rotates spinner disc 19 for a given amount of time to fill the feeding tray and then will de-energize the motor so that a pre-selected amount of animal feed is retained in the feeding tray and no more. This significantly reduces the amount of feed that is required as compared to the prior art devices.

The deer feeder may include a bottom member which isolates the lower discharge assembly from the environment.

Figure 5:
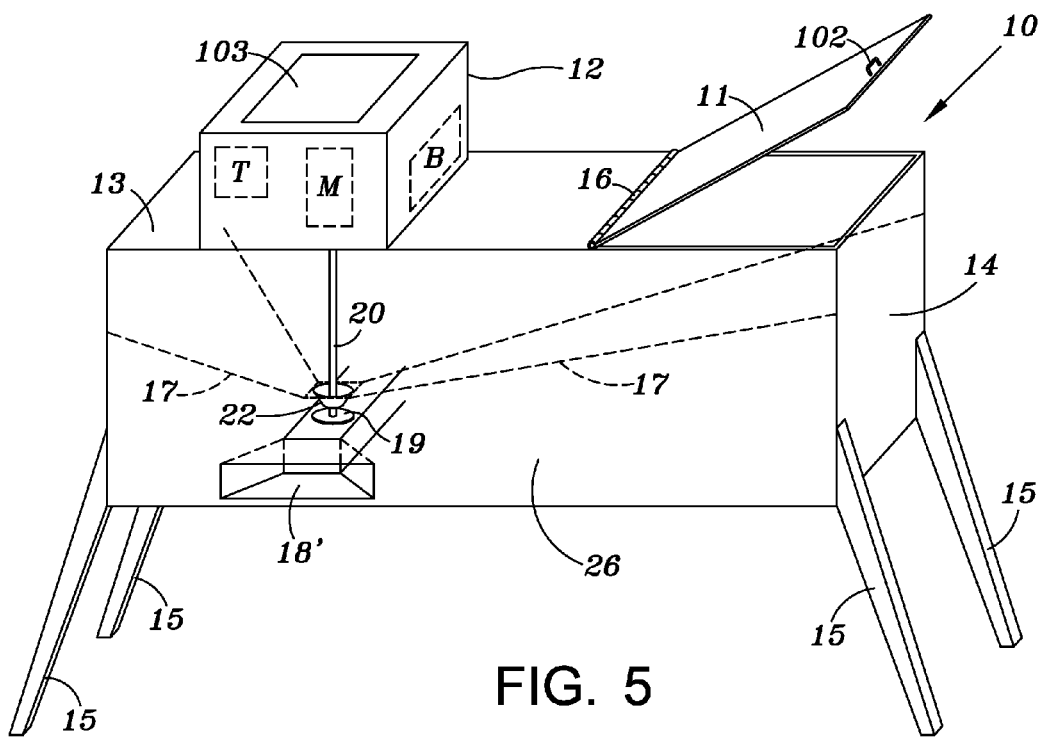
FIG. 5 is a schematic view of an alternative arrangement for the feeding tube and outlet.
Figure 6:
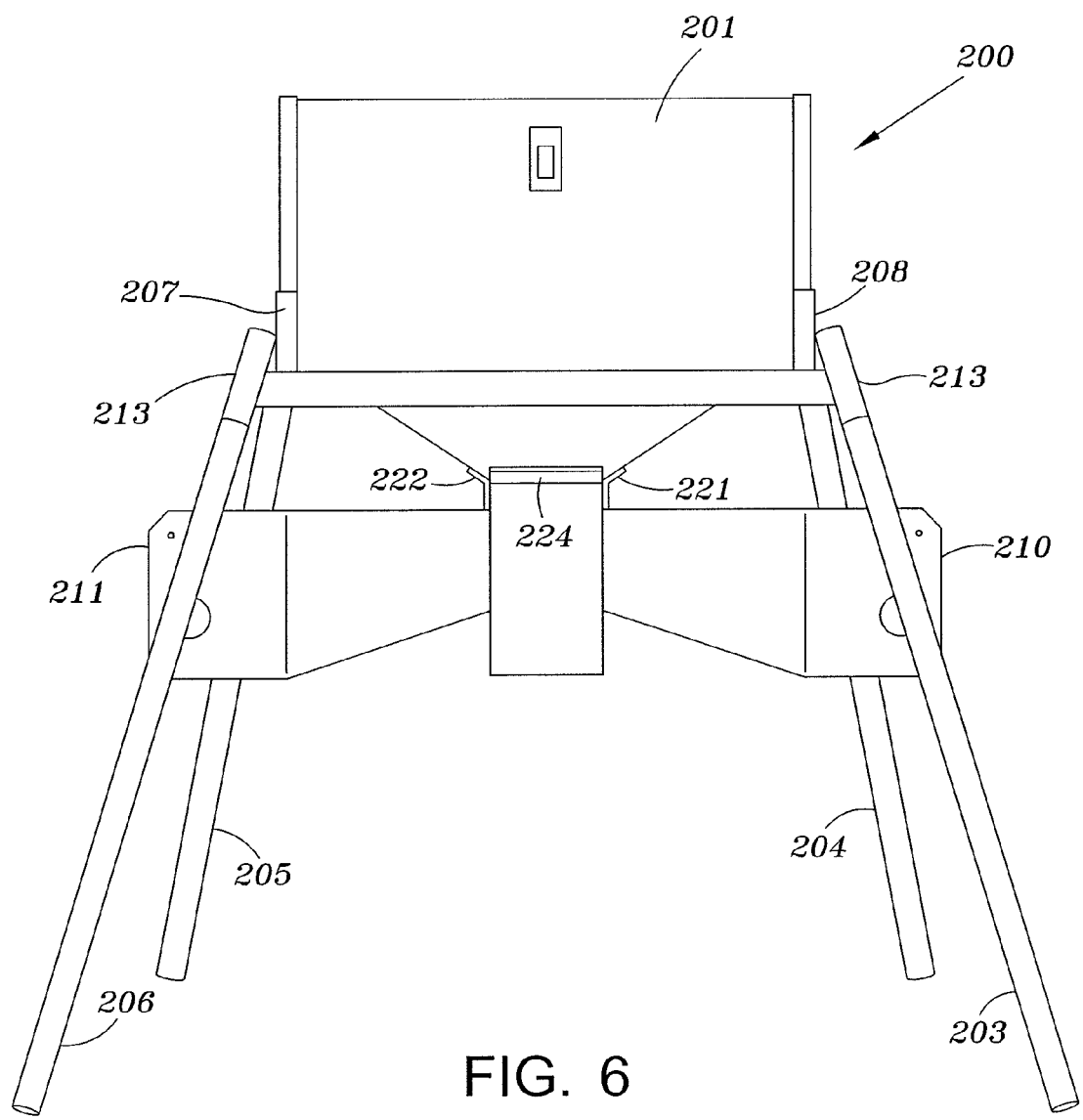
FIG. 6 is a frontal view of a further embodiment of the invention.
Figure 10:
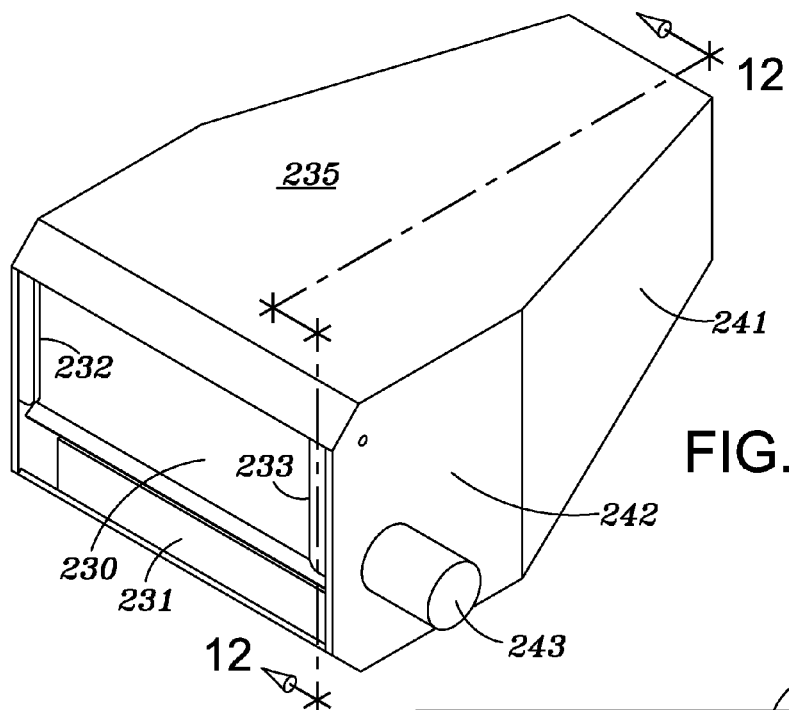
FIG. 10 is a perspective view of a single discharge tube assembly.

Outlet 18 may be widened so as to accommodate a plurality of animals to feed at one time. In such an arrangement the feeding tube could be modified by having the feeding assembly with feeding tubes 31 diverging outwardly toward the widened outlet 18' as figuratively shown in FIG. 5. Support assembly 100 would also be modified to accommodate the diverging feed tube.

In order to restrict access to the feeder assembly, a closure mechanism, for example, flaps 71 and 72 may be positioned on the housing for selectively covering openings 18. The flaps may be mounted for reciprocal movement in tracks 73 as shown in FIG. 4 and may be moved up and down by any known reciprocating mechanism 106 and 107 for example, by a linear actuator, a rack and pinion mechanism, a crank arm or any other mechanical leakage for effecting reciprocal motion. Alternatively, the flaps may be pivotably mounted on the housing for movement outwardly from the housing by a suitable crank mechanism to uncover the opening. The actuating mechanism may include a motor that is synchronized with the spinner disc motor so that the flaps are in an open position for a limited time after the spinner disk has been actuated. The actuating mechanism motor may also be synchronized with the spinner disc motor to open the flaps for feeding during daytime hours and closed at night to prevent nocturnal feeding.

The apparatus as defined above may be utilized in the following manner. The deer feeder can be placed in the area where game is to be attracted. The openings 18 are positioned at a height above the ground so that only the desired game is able to access the feeding tray. A supply of game feed is placed within the housing and the timer for the spinner disc motor is set for a limited time during the day so that only a measured amount of feed is fed to the feeding trays formed in the dispensing assembly. Once the feed has been delivered to the feeding trays, flaps 71 and 72 can be raised upwardly by a timer mechanism so as to uncover opening 18 in the housing. At this point, game such as deer will be able to access feed in the feed trays until all the feed is exhausted. After a predetermined amount of time, a timer may act to lower the flaps so as to block access to openings 18. In addition, hunters can reasonably forecast how long the supply of food will last and when it needs to be replenished.

A second embodiment 200 of the invention is shown in FIGS. 6-12.

In this embodiment a hopper 201 is adapted to contain a supply of game feed. The hopper may be supported above the ground by four legs 203, 204, 205 and 206 in any suitable manner. In this case a plurality of L-shaped brackets 207 and 208 extend between the legs and the hopper.

A feeding assembly 250 including oppositely extending feeding tubes 210 and 211 is connected to a bottom portion of the hopper 213. The bottom portion 213 of the hopper may have sloping walls as shown at 22 in FIG. 4 and an opening 90.

Feeding assembly 250 includes four flanges 221, 222, 223 and 224 which may be used to fasten the feeding assembly to the bottom portion 213 of hopper 201 by any suitable means such as welding or nuts and bolts.

Feeding assembly 250 includes a central rectangular housing 225 which has a central opening 251 which is adapted to allow flow of feed from hopper 201 into the interior of housing 225.

Feeding tubes 210 and 211 are substantially identical and feeding tube 211 will be described by reference to FIGS. 8-12.

Figure 11:
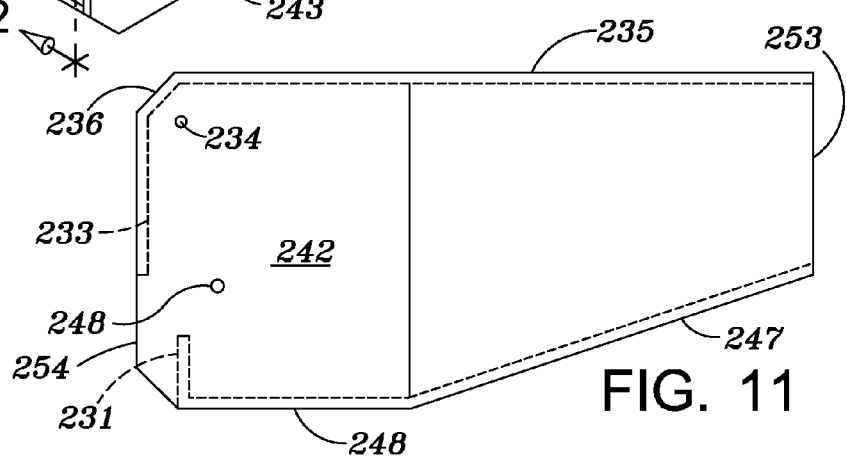
FIG. 11 is a side view of a discharge tube assembly.

Feeding tube 211 is formed by top wall 235, side walls 241 and 241 (front and back) and bottom walls 247 and 248. As shown in FIG. 11 the feeding tube has an inlet 253 and an outlet 254. Outlet 254 is formed by downwardly extending wall portion 236, strips 232 and 233 and a lip member 231 extending between side walls 242. A flap member 230 includes an upper rod member 246 that extends through apertures 234 in side walls 242 so that it is pivotably mounted within the feeding tube as shown in FIG. 12.

An electrically actuated plunger assembly 243 is mounted on side wall 242 and it includes a pin member 258 adapted to be moved in and out of the interior of feeding tube 211 through an aperture 248 provided in side wall 242.

Figure 12:
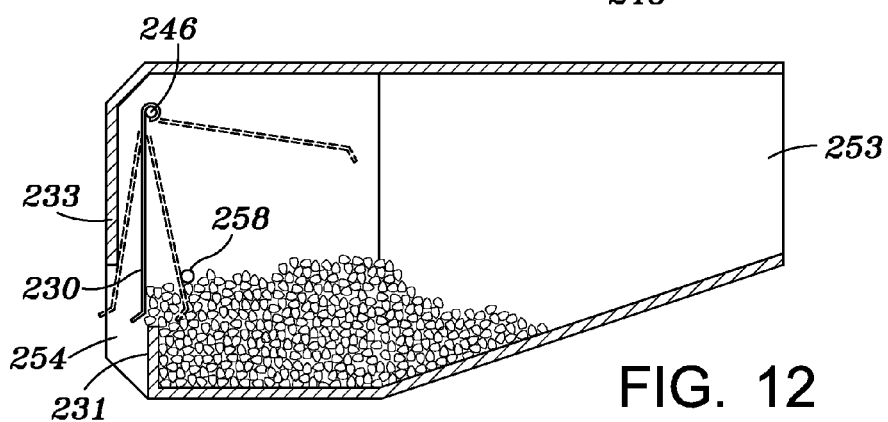
FIG. 12 is a cross-sectional view of a discharge tube assembly.

As shown in FIG. 12, flap member 230 is normally positioned by gravity within the feeding tube so as to block entry into the interior of the feeding tube. When the pin 258 of actuator 243 is extended into the feeding tube, it will block inward movement of the flap as shown FIG. 12. However, when it is desired to allow access to the interior of the feeding tube where feed is located, the pin of actuator 243 is withdrawn from the interior of the feeding tube. This allows animals such as deer to access the interior of the feeding tube using their nose to pivot the door rearward as shown in phantom in FIG. 12. Flap member 230 is restrained from moving outside the feeding tube by strips 232. Lip 231 acts to contain a given amount of feed within the outlet tube on floor 260.

Operation of the embodiment of FIGS. 6-11 is similar to that of the first embodiment. When it is desired to attract game such as deer, a controlled amount of feed is directed into feeding tubes 211 and 210 and actuator 243 is activated by a timer to withdraw the pin from the interior of the housing. This allows deer to rotate the flap 230 inwardly and thus the deer have access to the feed.

When it is desired to prevent access to the feed during the nighttime for example, the actuator is activated to extend the pin into the housing thus preventing pivoting of the flap and consequently access to the game feed. A dispensing or metering device may be positioned within housing 225 along with a motor, battery and timer for actuating the dispensing or metering device to allow flow of animal feed into the feeding tubes via the inclined bottom walls 247.

Although the present invention has been described with respect to specific details, it is not intended that such details should be regarded as limitations on the scope of the invention, except to the extent that they are included in the accompanying claims.

I claim:

1. Apparatus for dispensing a controlled amount of animal feed comprising:
   a hopper for holding the animal feed;
   a plurality of legs attached to the hopper for supporting the hopper above ground level, an outlet in a bottom portion of the hopper;
   a feeding tube that receives animal feed from the hopper; the feeding tube including an opening to allow access to an interior portion of the feeding tube adapted to hold an amount of animal feed;
   a housing attached to the feeding tube, the housing having a spinner assembly located therein,
   a moveable flap positioned on the feeding tube to selectively open and close the feeding tube opening, and
   a timer for an actuator to selectively allow access to the interior of the feeding tube by containing movement of the movable flap,
   wherein the movable flap is freely supported in the opening at an upper portion of the flap so as to be biased by gravity to a closed positions.

2. The apparatus of claim 1 further including an electrical actuator for selectively moving a pin into and out of the outlet tube so as to selectively block movement of the movable flap into an interior portion of the outlet tube, the pin being unattached to the moveable flap.

3. The apparatus of claim 1 wherein the outlet tube includes a bottom floor having an inclined portion and a generally horizontal portion.

4. The apparatus of claim 1 further including a pair of strips on either side of the outlet tube opening that prevent the flap from pivoting outwardly of the outlet tube.

5. The apparatus of claim 4 further including a lip positioned on a bottom floor of the outlet tube to cause an amount of the animal feed to accumulate on the bottom floor.

* * * * *